United States Patent
Fiatal

(10) Patent No.: US 9,473,914 B2
(45) Date of Patent: Oct. 18, 2016

(54) SYSTEM AND METHOD FOR PROVIDING A NETWORK SERVICE IN A DISTRIBUTED FASHION TO A MOBILE DEVICE

(71) Applicant: Seven Networks, LLC, Marshall, TX (US)

(72) Inventor: Trevor Fiatal, Fremont, CA (US)

(73) Assignee: Seven Networks, LLC, Marshall, TX (US)

( * ) Notice: Subject to any disclaimer, the term of this patent is extended or adjusted under 35 U.S.C. 154(b) by 0 days.

(21) Appl. No.: 14/583,726

(22) Filed: Dec. 28, 2014

(65) Prior Publication Data

US 2015/0111541 A1   Apr. 23, 2015

Related U.S. Application Data

(60) Continuation of application No. 13/427,748, filed on Mar. 22, 2012, which is a division of application No. 13/208,200, filed on Aug. 11, 2011, now Pat. No. 8,914,002, which is a continuation of application No. 12/008,710, filed on Jan. 11, 2008, now Pat. No. 8,107,921.

(51) Int. Cl.
*H04W 12/06* (2009.01)
*H04W 4/20* (2009.01)
(Continued)

(52) U.S. Cl.
CPC ............ *H04W 4/20* (2013.01); *H04M 3/4872* (2013.01); *H04W 4/16* (2013.01); *H04W 4/24* (2013.01); *H04W 12/06* (2013.01)

(58) Field of Classification Search
CPC ...... H04W 12/06; G06F 21/10; G06Q 30/06
See application file for complete search history.

(56) References Cited

U.S. PATENT DOCUMENTS 5,619,507 A   4/1997   Tsuda
5,619,648 A   4/1997   Canale et al.
(Continued)

FOREIGN PATENT DOCUMENTS

EP   1197858 A1   4/2002
EP   2464057 A1   6/2012
(Continued)

OTHER PUBLICATIONS

USPTO, Non-Final Rejection for U.S. Appl. No. 14/873,156, Jan. 20, 2016.
(Continued)

*Primary Examiner* — Myron K Wyche
(74) *Attorney, Agent, or Firm* — NK Patent Law, PLLC

(57) ABSTRACT

A system for providing mobile network services is disclosed. A first server is communicatively coupled to a mobile device over a mobile network and configured to receive a unique authentication token from the mobile device over the mobile network and provide a service to the mobile device via the mobile network, the service associated with the unique authentication token and branded by an entity other than an operator of the mobile network. A second server is communicatively coupled to the mobile network and configured to monitor usage of the mobile network by the mobile device. A computing device is communicatively coupled to the mobile device over the mobile network and configured to receive the unique authentication token from the mobile device over the mobile network, access digital content over a network, and transfer a representation of the digital content to the mobile device over the mobile network.

39 Claims, 4 Drawing Sheets

(51) Int. Cl.
    *H04M 3/487*    (2006.01)
    *H04W 4/24*     (2009.01)
    *H04W 4/16*     (2009.01)

(56) References Cited

U.S. PATENT DOCUMENTS

| | | | |
|---|---|---|---|
| 5,625,815 | A | 4/1997 | Maier et al. |
| 5,692,039 | A | 11/1997 | Brankley et al. |
| 5,701,469 | A | 12/1997 | Brandli et al. |
| 5,706,507 | A | 1/1998 | Schloss |
| 5,752,186 | A | 5/1998 | Malackowski et al. |
| 5,778,361 | A | 7/1998 | Nanjo et al. |
| 5,781,906 | A | 7/1998 | Aggarwal et al. |
| 5,787,430 | A | 7/1998 | Doeringer et al. |
| 6,185,184 | B1 | 2/2001 | Mattaway et al. |
| 6,336,117 | B1 | 1/2002 | Massarani |
| 6,507,727 | B1 * | 1/2003 | Henrick .......... G06Q 30/06 348/E7.071 |
| 6,571,279 | B1 | 5/2003 | Herz et al. |
| 6,668,046 | B1 | 12/2003 | Albal |
| 6,820,116 | B1 | 11/2004 | Pyhälammi et al. |
| 6,985,933 | B1 | 1/2006 | Singhal et al. |
| 7,092,696 | B1 | 8/2006 | Hosain et al. |
| 7,174,156 | B1 | 2/2007 | Mangal |
| 7,219,139 | B2 | 5/2007 | Martin et al. |
| 7,284,664 | B1 | 10/2007 | Ivchenko et al. |
| 7,353,274 | B1 | 4/2008 | Rouhi et al. |
| 7,398,271 | B1 | 7/2008 | Borkovsky et al. |
| 7,443,847 | B1 | 10/2008 | Albert et al. |
| 7,516,208 | B1 | 4/2009 | Kerrison et al. |
| 7,516,238 | B2 | 4/2009 | Key et al. |
| 7,526,547 | B2 | 4/2009 | Rodrigo |
| 7,548,947 | B2 | 6/2009 | Kasriel et al. |
| 7,593,714 | B2 | 9/2009 | Schultz et al. |
| 7,752,209 | B2 | 7/2010 | Ramer et al. |
| 7,769,805 | B1 | 8/2010 | Barnes et al. |
| 7,899,996 | B1 | 3/2011 | Levin-Michael |
| 7,953,934 | B2 | 5/2011 | Thomas et al. |
| 7,957,691 | B1 | 6/2011 | Lee |
| 8,000,720 | B2 | 8/2011 | Aaron |
| 8,005,891 | B2 | 8/2011 | Knowles et al. |
| 8,024,452 | B2 | 9/2011 | Shenfield et al. |
| 8,131,271 | B2 | 3/2012 | Ramer et al. |
| 8,194,680 | B1 | 6/2012 | Brandwine et al. |
| 8,412,932 | B2 | 4/2013 | Schneider |
| 8,539,552 | B1 | 9/2013 | Grabelsky et al. |
| 8,577,732 | B1 | 11/2013 | Martin et al. |
| 8,831,561 | B2 | 9/2014 | Sutaria et al. |
| 8,849,902 | B2 | 9/2014 | Fiatal |
| 8,862,657 | B2 | 10/2014 | Fiatal |
| 2002/0062384 | A1 | 5/2002 | Tso |
| 2002/0077084 | A1 | 6/2002 | Zellner et al. |
| 2002/0087655 | A1 | 7/2002 | Bridgman et al. |
| 2002/0103934 | A1 | 8/2002 | Fishman et al. |
| 2002/0120779 | A1 | 8/2002 | Teeple et al. |
| 2002/0138439 | A1 | 9/2002 | Matsushima et al. |
| 2002/0155848 | A1 | 10/2002 | Suryanarayana |
| 2002/0174189 | A1 | 11/2002 | Peng |
| 2002/0198991 | A1 | 12/2002 | Gopalakrishnan et al. |
| 2003/0026222 | A1 | 2/2003 | Kotzin |
| 2003/0037094 | A1 | 2/2003 | Douceur et al. |
| 2003/0046586 | A1 | 3/2003 | Bheemarasetti et al. |
| 2003/0050041 | A1 | 3/2003 | Wu |
| 2003/0187984 | A1 | 10/2003 | Banavar et al. |
| 2003/0210666 | A1 | 11/2003 | Trossen et al. |
| 2003/0236890 | A1 | 12/2003 | Hurwitz et al. |
| 2004/0030749 | A1 | 2/2004 | Bowman-Amuah |
| 2004/0042432 | A1 | 3/2004 | Riazi et al. |
| 2004/0068579 | A1 | 4/2004 | Marmigere et al. |
| 2004/0127214 | A1 | 7/2004 | Reddy et al. |
| 2004/0181550 | A1 | 9/2004 | Warsta et al. |
| 2004/0259542 | A1 | 12/2004 | Viitamaki et al. |
| 2005/0021494 | A1 | 1/2005 | Wilkinson |
| 2005/0071451 | A1 | 3/2005 | Key et al. |
| 2005/0080928 | A1 | 4/2005 | Beverly et al. |
| 2005/0102284 | A1 | 5/2005 | Srinivasan et al. |
| 2005/0108322 | A1 | 5/2005 | Kline et al. |
| 2005/0120181 | A1 | 6/2005 | Arunagirinathan et al. |
| 2005/0154836 | A1 | 7/2005 | Steely et al. |
| 2005/0256880 | A1 | 11/2005 | Nam Koong et al. |
| 2006/0095339 | A1 * | 5/2006 | Hayashi .......... G06Q 30/06 705/26.8 |
| 2006/0190413 | A1 * | 8/2006 | Harper .......... G06F 21/10 705/65 |
| 2006/0272028 | A1 | 11/2006 | Maes |
| 2006/0277271 | A1 | 12/2006 | Morse et al. |
| 2006/0294223 | A1 | 12/2006 | Glasgow et al. |
| 2007/0050591 | A1 | 3/2007 | Boyd et al. |
| 2007/0053345 | A1 | 3/2007 | Hsu et al. |
| 2007/0117548 | A1 | 5/2007 | Fernandez-Alonso et al. |
| 2007/0147411 | A1 | 6/2007 | Bijwaard et al. |
| 2007/0149168 | A1 | 6/2007 | Hariki |
| 2007/0156842 | A1 | 7/2007 | Vermeulen et al. |
| 2007/0168364 | A1 | 7/2007 | Douceur et al. |
| 2007/0254631 | A1 | 11/2007 | Spooner |
| 2007/0270139 | A1 | 11/2007 | Jendbro et al. |
| 2007/0276767 | A1 | 11/2007 | Kim et al. |
| 2008/0022003 | A1 | 1/2008 | Alve |
| 2008/0071988 | A1 | 3/2008 | Schloter et al. |
| 2008/0114690 | A1 | 5/2008 | Skidmore et al. |
| 2008/0117922 | A1 | 5/2008 | Cockrell et al. |
| 2008/0133603 | A1 | 6/2008 | Fischer et al. |
| 2008/0139112 | A1 | 6/2008 | Sampath et al. |
| 2008/0150704 | A1 | 6/2008 | Igoe |
| 2008/0180228 | A1 | 7/2008 | Wakefield et al. |
| 2008/0189365 | A1 | 8/2008 | Narayanaswami et al. |
| 2008/0207182 | A1 | 8/2008 | Maharajh et al. |
| 2008/0221715 | A1 | 9/2008 | Krzyzanowski et al. |
| 2008/0256090 | A1 | 10/2008 | Dietterich et al. |
| 2008/0271123 | A1 | 10/2008 | Ollis et al. |
| 2008/0299956 | A1 | 12/2008 | Bailey et al. |
| 2008/0301300 | A1 | 12/2008 | Toub |
| 2008/0313324 | A1 | 12/2008 | Wong et al. |
| 2009/0019141 | A1 | 1/2009 | Bush et al. |
| 2009/0027222 | A1 | 1/2009 | Larsson et al. |
| 2009/0046740 | A1 | 2/2009 | Ruckart |
| 2009/0064346 | A1 | 3/2009 | Larsson et al. |
| 2009/0077326 | A1 | 3/2009 | Motohashi |
| 2009/0081944 | A1 | 3/2009 | Yavuz et al. |
| 2009/0187939 | A1 | 7/2009 | Lajoie |
| 2009/0222901 | A1 | 9/2009 | Schneider |
| 2009/0248696 | A1 | 10/2009 | Rowles et al. |
| 2009/0264138 | A1 | 10/2009 | Kang et al. |
| 2009/0275349 | A1 | 11/2009 | Bae et al. |
| 2009/0282130 | A1 | 11/2009 | Antoniou et al. |
| 2009/0286560 | A1 | 11/2009 | Willis |
| 2009/0287750 | A1 | 11/2009 | Banavar et al. |
| 2010/0064341 | A1 | 3/2010 | Aldera |
| 2010/0118190 | A1 | 5/2010 | Salfati et al. |
| 2010/0186011 | A1 | 7/2010 | Magenheimer |
| 2010/0227594 | A1 | 9/2010 | de Vries |
| 2010/0229096 | A1 | 9/2010 | Maiocco et al. |
| 2010/0241810 | A1 | 9/2010 | Lowery et al. |
| 2010/0274983 | A1 | 10/2010 | Murphy et al. |
| 2010/0279662 | A1 | 11/2010 | Kuusinen et al. |
| 2010/0323664 | A1 | 12/2010 | Sivaram et al. |
| 2011/0019978 | A1 | 1/2011 | Jagmag |
| 2011/0026069 | A1 | 2/2011 | Jesudason et al. |
| 2011/0028129 | A1 | 2/2011 | Hutchison et al. |
| 2011/0040718 | A1 | 2/2011 | Tendjoukian et al. |
| 2011/0045847 | A1 | 2/2011 | Roin et al. |
| 2011/0126060 | A1 | 5/2011 | Grube et al. |
| 2011/0138102 | A1 | 6/2011 | Glikson et al. |
| 2011/0153937 | A1 | 6/2011 | Annamalaisami et al. |
| 2011/0185355 | A1 | 7/2011 | Chawla et al. |
| 2011/0255444 | A1 | 10/2011 | Soliman et al. |
| 2011/0264731 | A1 | 10/2011 | Knowles et al. |
| 2011/0296120 | A1 | 12/2011 | Khan |
| 2011/0296415 | A1 | 12/2011 | Khan et al. |
| 2012/0054386 | A1 | 3/2012 | Hanes |
| 2012/0110275 | A1 | 5/2012 | Ganti et al. |
| 2012/0130973 | A1 | 5/2012 | Tamm et al. |
| 2012/0140750 | A1 | 6/2012 | Yan et al. |
| 2012/0254417 | A1 | 10/2012 | Luna |

(56) References Cited

U.S. PATENT DOCUMENTS

| | | | |
|---|---|---|---|
| 2013/0217330 | A1 | 8/2013 | Gärdenfors et al. |
| 2013/0322451 | A1 | 12/2013 | Wang et al. |
| 2013/0346312 | A1 | 12/2013 | Calabrese et al. |
| 2014/0025953 | A1 | 1/2014 | Venters et al. |

FOREIGN PATENT DOCUMENTS

| | | |
|---|---|---|
| JP | 2003323370 A | 11/2003 |
| WO | 2007127878 A1 | 11/2007 |
| WO | 2010068842 A1 | 6/2010 |

OTHER PUBLICATIONS

Non-Final Office Action mailed Feb. 6, 2015 for U.S. Appl. No. 14/468,265.
USPTO, Non-Final Rejection for U.S. Appl. No. 14/468,272, Jan. 14, 2016.
Non Final Office Action mailed Jul. 28, 2011 for U.S. Appl. No. 12/008,710.
Non Final Office Action mailed May 7, 2014 for U.S. Appl. No. 13/208,185.
Non Final Office Action mailed Mar. 10, 2014 for U.S. Appl. No. 13/208,200.
Final Office Action mailed Apr. 11, 2012 for U.S. Appl. No. 13/208,200.
Non Final Office Action mailed Dec. 21, 2011 for U.S. Appl. No. 13/208,200.
Final Office Action mailed Dec. 3, 2014 for U.S. Appl. No. 13/427,748.
Non Final Office Action mailed May 9, 2014 for U.S. Appl. No. 13/427,748.
USPTO, Final Rejection for U.S. Appl. No. 13/427,748, mailed on Feb. 22, 2016.
USPTO, Notice of Allowance for U.S. Appl. No. 14/873,156, mailed on Mar. 28, 2016.
EPO, File history of European Patent Application No. 12774661.8, pulled on May 20, 2016.
Zhang, Q. et al.: "Cloud computing: state-of-the-art and research challenges", J Internet Serv Appl (2010) 1: 7-18.
Kino, T.: "Infrastructure Technology for Cloud Services", Fujitsu Sci. Tech. J., vol. 47, No. 4, pp. 434-442 (Oct. 2011).
UKIPO, File history of UK Patent Application No. 13184353, pulled on May 20, 2016.
Li, F. et al.: "Collaborative Storage with Mobile Devices in Wireless Networks for P2P Media Sharing", Wireless Telecommunications Symposium, 2008, PD-2008-04-24, ISBN 978-1-4244-1869-5.
Gavidia, D. et al.: "A Probabilistic Replication and Storage Scheme for Large Wireless Networks of Small Devices", Mobile Ad Hoc and Sensor Systems, 2008. MASS 2008. 5th IEEE International Conference on, PD-Sep. 29, 2008, p. 469-476, ISBN 978-1-4244-2574-7.
Coughlin, T. M: "Virtualization of Consumer Storage", Consumer Electronics (ISCE), 2010 IEEE 14th International Symposium on, PD-Jun. 7, 2010, p. 1-4, ISBN 978-1-4244-6671-9.
UKIPO, File history of UK Patent Application No. 1406703.7, pulled on May 20, 2016
USPTO, Final Rejection for U.S. Appl. No. 13/451,327, mailed on Dec. 5, 2013.
USPTO, Non-Final Rejection for U.S. Appl. No. 13/451,327, mailed on Apr. 2, 2013.
USPTO, Final Rejection for U.S. Appl. No. 13/451,327, mailed on Dec. 5, 2012.
USPTO, Non-Final Rejection for U.S. Appl. No. 13/451,327, mailed on Sep. 4, 2012.
USPTO, Final Rejection for U.S. Appl. No. 13/605,475, mailed on Feb. 9, 2015.
USPTO, Non-Final Rejection for U.S. Appl. No. 13/605,475, mailed on Aug. 15, 2014.
USPTO, Final Rejection for U.S. Appl. No. 13/605,475, mailed on Jan. 9, 2014.
USPTO Non-Final Rejection for U.S. Appl. No. 13/605,475, mailed on Jul. 9, 2013.
USPTO, Non-Final Rejection for U.S. Appl. No. 14/528,748, mailed on Feb. 16, 2016.
EPO, File history of European Patent Application No. 12774623.8, pulled on May 24, 2016.
de la Iglesia, D. G. et al.: "Enhancing Mobile Learning Activities by the Use of Mobile Virtual Devices: Some Design and Implementation Issues", 2010 2nd International Conference on Intelligent Networking and Collaborative Systems, (Nov. 24, 2010), p. 137-144.
UKIPO, File history of UK Patent No. 2505103, pulled on May 24, 2016.
USPTO Notice of Allowance for U.S. Appl. No. 13/451,340, mailed on Jul. 30, 2012.
USPTO Notice of Allowance for U.S. Appl. No. 13/554,859, mailed on Sep. 18, 2012.
USPTO Non-Final Rejection for U.S. Appl. No. 13/740,785, mailed on Jun. 2, 2014.
EPO, File history of European Patent Application No. 12774773.1, pulled on May 27, 2016.
UKIPO, File history of UK Patent No. 2503405, pulled on May 26, 2016.
Johnsen, L.: Contention Distribution in Ad Hoc Networks, Master Thesis, Norwegian University of Science and Technology, Department of Telematics, 2006 (Johnsen, L) See pp. 63-65.
Paul, S. et al.: "The cache-and-forward network architecture for efficient mobile content delivery services in the future Internet", IN: FirstITU-T Kaleidoscope Academic Conference on Innovations in NGN: Future Network and Services, May 12-13, 2008, pp. 367-374.
USPTO, Final Rejection for U.S. Appl. No. 13/451,361, mailed on Dec. 31, 2014.
USPTO, Non-Final Rejection for U.S. Appl. No. 13/451,361, mailed on Aug. 7, 2014.
USPTO, Non-Final Rejection for U.S. Appl. No. 13/451,361, mailed on Jun. 13, 2014.
USPTO, Final Rejection for U.S. Appl. No. 13/451,361, mailed on Aug. 15, 2013.
USPTO, Non-Final Rejection for U.S. Appl. No. 13/451,361, mailed on Mar. 1, 2013
USPTO Final Rejection for U.S. Appl. No. 13/451,361, mailed on Nov. 8, 2012.
USPTO, Non-Final Rejection for U.S. Appl. No. 13/451,361, mailed on Jul. 19, 2012.
Newton's Telecom Dictionary, 20th edition, Mar. 2004.
USPTO, Final Rejection for U.S. Appl. No. 14/673,788, mailed on Nov. 18, 2015.
USPTO, Non-Final Rejection for U.S. Appl. No. 14/673,788, mailed on May 12, 2015.
USPTO, Notice of Allowance for U.S. Appl. No. 14/467,881, mailed on Apr. 11, 2016.
ISA/KR, International Search Report and Written Opinion for PCT Patent Application No. PCT/US2012/034288, mailed on Nov. 23, 2012.
ISA/KR, International Search Report and Written Opinion for PCT Patent Application No. PCT/US2012/034297, mailed on Nov. 26, 2012.
ISA/KR, International Search Report and Written Opinion for PCT Patent Application No. PCT/US2012/034300, mailed on Nov. 23, 2012.

* cited by examiner

SYSTEM AND METHOD FOR PROVIDING A NETWORK SERVICE IN A DISTRIBUTED FASHION TO A MOBILE DEVICE

CROSS-REFERENCE TO RELATED APPLICATIONS

This application is a continuation of U.S. patent application Ser. No. 13/427,748 entitled "System and Method for Providing a Network Service in a Distributed Fashion to a Mobile Device" and filed on Mar. 22, 2012, which is divisional of U.S. patent application Ser. No. 13/208,200 entitled "System and Method for Providing a Network Service in a Distributed Fashion to a Mobile Device" and filed on Aug. 11, 2011, now U.S. Pat. No. 8,914,002, which is a continuation of U.S. patent application Ser. No. 12/008,710 entitled "Mobile Virtual Network Operator" and filed on Jan. 11, 2008, now U.S. Pat. No. 8,107,921 issued on Jan. 31, 2012, which is related to U.S. patent application Ser. No. 12/002,300 entitled "Content Delivery to a Mobile Device from a Content Service" and filed on Dec. 13, 2007, now U.S. Pat. No. 8,793,305. This application is also related to U.S. patent application Ser. No. 11/729,314 entitled "System and Method for Group Management" and filed on Mar. 27, 2007. This application is also related to co-pending U.S. patent application Ser. No. 13/208,185 entitled "Mobile Virtual Network Operator" and filed on Aug. 11, 2011, now U.S. Pat. No. 8,909,192. The disclosures of each of these matters are incorporated herein by reference.

BACKGROUND

1. Field of the Invention

The present invention generally relates to the field of wireless mobile device network services. More specifically, the present invention relates to providing network services to a mobile device over a mobile network.

2. Description of the Background Art

Mobile devices may be used to communicate using a variety of communication mediums over a mobile network, including voice telephone calls, voice mail, email, and text messaging. In addition, a variety of services may be provided over a mobile network such as content from web sites and other providers. For example, digital content such as ring-tones may be provided over a mobile network. Typically, the multiple communication mediums, network services, and digital content are provided by different entities whereby interaction and integration may not easily occur.

Providers of network services often desire to offer a bundled package of media and network services to customers under a single brand. However, unless the provider is also a mobile network service provider, the provider of the network services may have difficulty in providing an integrated mobile network service offering to its customers to meet their needs.

SUMMARY

Systems and methods for a mobile virtual network operator to overcome problems in the prior art related to providing mobile network services are provided. The mobile virtual network operator may provide unique content, services, policies, and pricing for mobile network services while utilizing and operating over a mobile network provided by a mobile network service provider. The mobile virtual network operator may brand and bill its services independently from the mobile network service provider. The mobile virtual network operator may bundle network services, communication services, and digital content delivery in an integrated fashion that enables interoperability and seamless communications across multiple mediums.

A system for providing mobile network services includes a first server in communication with a mobile device over a mobile network. The first server is configured to receive a unique authentication token from the mobile device over the mobile network. The first server is further configured to provide a service to the mobile device via the mobile network. The provided service is associated with the unique authentication token and branded by an entity other than an operator of the mobile network. A second server is in communication with the mobile network. The second server is configured to monitor usage of the mobile network by the mobile device. The usage is related to the service provided to the mobile device by the first server.

A method for providing a mobile network service includes receiving a unique authentication token from a mobile device at a server, providing a service to the mobile device via a mobile network, and monitoring usage of the mobile network by the mobile device. The server is in communication with the mobile device over the mobile network. The service is associated with the unique authentication token and branded by an entity other than an operator of the mobile network. The usage is related to the service provided to the mobile device via the mobile network.

A method of billing for a mobile network service provided to a mobile device by a mobile virtual network operator includes identifying a user of the mobile device. The method also includes identifying a service plan purchased from the mobile virtual network operator. The service plan is purchased by the user of the mobile device. The method also includes identifying a mobile network service provided to the mobile device via a mobile network. The mobile network service is provided on behalf of the mobile virtual network operator. The method also includes determining a price of the service plan purchased by the user of the mobile device and a price of the network service provided to the mobile device via the mobile network. The method further includes submitting information representative of an invoice for the service plan purchased and the network service provided to the mobile device. The user is billed on behalf of the mobile network service provider by the mobile virtual network operator.

A computer program is stored on a computer readable storage medium. The program is executable by a processor for performing a method for providing a mobile network service. The method includes providing a unique authentication token from a mobile device to a server and using a service provided by the server via a mobile network. The server is in communication with the mobile device over the mobile network. The service is associated with the unique authentication token and branded by an entity other than an operator of the mobile network. The method further includes downloading a representation of digital content stored at a computing device in communication with the server over a network. The download is responsive to the unique authentication token provided to the server, and the computing device is controlled by an entity other than an entity that operates the mobile network or the server.

DETAILED DESCRIPTION

Figure 1:
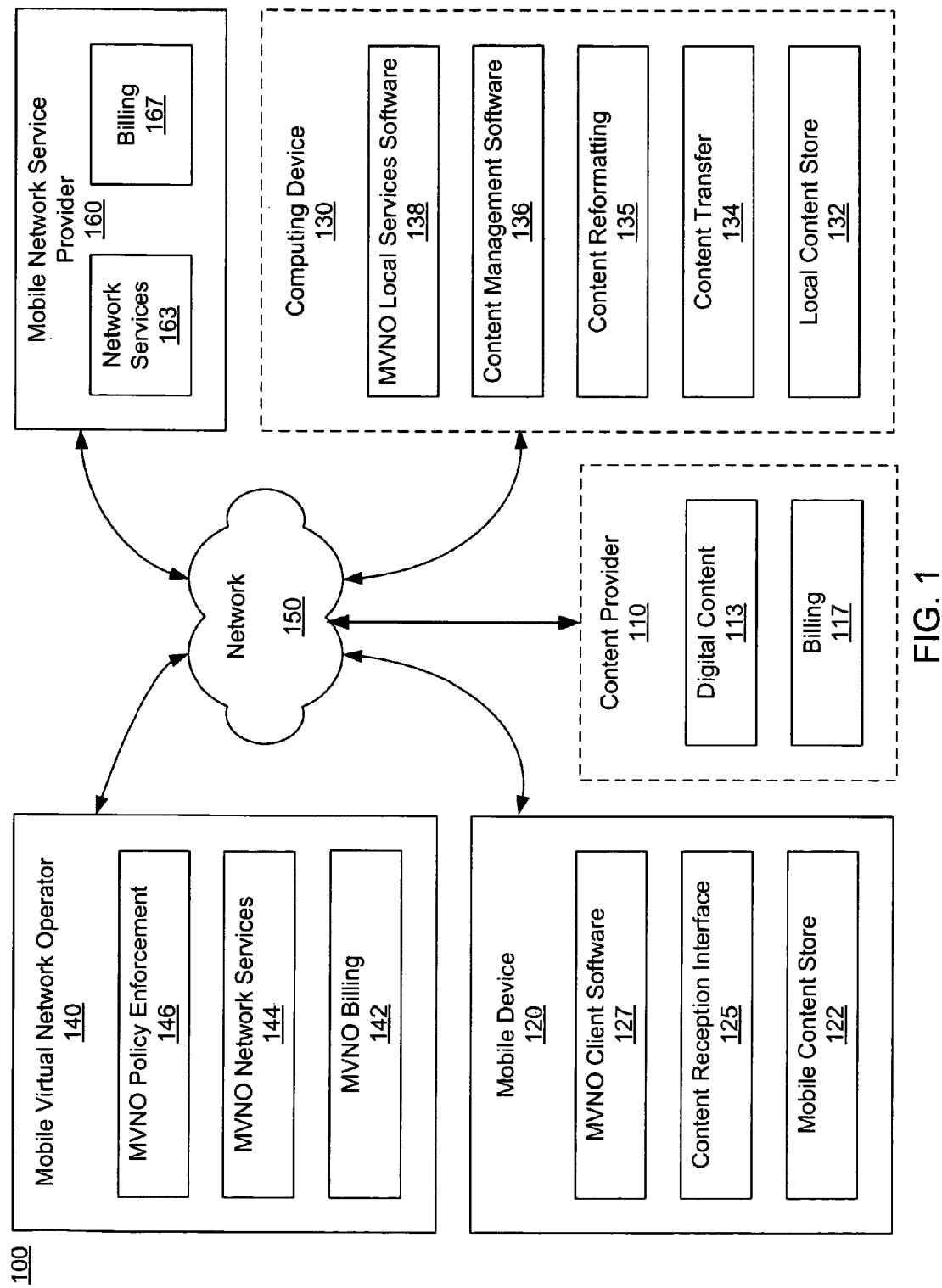
FIG. 1 is an illustration of a mobile virtual network.

FIG. 1 is an illustration of a mobile virtual network 100. The mobile virtual network 100 includes a mobile virtual network operator 140 (which may include a server), a mobile network service provider 160, a mobile device 120, an optional personal computing device 130, and an optional content provider 110. All of the aforementioned may be interconnected through network 150. The content provider 110, the personal computing device 130, the mobile virtual network operator 140; and the mobile network service provider 160 may include or use computing devices inclusive of a computer processor, memory, computer readable data storage media, network interfaces, and input/output devices such as a video display, keyboard, mouse, touchpad, touch screen, and so forth.

The mobile virtual network operator 140 may include one or more service or processing nodes configured to perform one or more functions of the mobile virtual network operator 140. The mobile virtual network operator 140 may also include a proxy for another service or processing node configured to perform one or more functions of the mobile virtual network operator 140. Each of the one or more nodes of the mobile virtual network operator 140 may independently operate and connect to the network 150. The mobile network service provider 160, the optional content provider 110, and the optional personal computing device 130 may be configured in a similar fashion.

The mobile device 120 may be configured to communicate between a user and other mobile devices as well as one or more computing devices over the network 150. The mobile device 120 may include a cellular telephone, a smart phone, a personal digital assistant (PDA), a wireless e-mail device, or a handheld computer. The mobile device 120 may include communications components (not shown) such as a radio frequency (RF) antenna, an optical transceiver (e.g., infrared), modulator/demodulator, and codec circuitry configured to interface with the network 150 and exchange data over the same. The mobile device 120 may include input/output components such as a display, keypad, keyboard, touchpad, touch screen, microphone, speaker, headphone jack, Bluetooth interface, speech recognition application, e-mail application, web browser application, MP3 music player, and so forth.

A server at the mobile virtual network operator 140 may provide a service to one or more customers over the network 150. The one or more customers may be users of the mobile device 120. The mobile virtual network operator 140 may maintain an account record associated with the user of the mobile device 120.

The account record may include an identifying element such as a user's customer account number, user ID or user name, password, mobile device electronic serial number (ESN), mobile device telephone number, landline telephone number, credit card number, and so forth. The account record may also include a mobile virtual network service plan, connection information for the user's personal computing device 130, account balance, payment history, mobile network service provider account information, and so forth. The mobile virtual network operator 140 may be configured to receive a unique authentication token from the mobile device 120 over the network 150, the unique authentication token being used to identify and authenticate the user of the mobile device 120 as a customer. The unique authentication token may include an identifying element included in the user's account record, as disclosed above.

The mobile virtual network operator 140 may include a mobile virtual network operator (MVNO) policy enforcement application 146 configured to enforce a network service policy associated with the user of the mobile device 120. The network service policy may include a maximum number of minutes of voice service per billing period, a maximum number of data bits transferred per billing period, and a maximum number of Short Message Service (SMS) text messages processed per billing period. The network service policy may also include a maximum number of picture or image files transferred per billing period, a maximum number of audio files transferred per billing period, and a maximum number of video files transferred per billing period. The network service policy may further include a maximum number of stored voice mail messages, an amount of utilized server data storage, and so forth. Transferring a file may include downloading the file, uploading the file, transferring a representation of the file, transmitting data representative of the file, and receiving data representative of the file. The functionality of the MVNO policy enforcement application 146 may be distributed or tasked to software running on the personal computing device 130.

The mobile virtual network operator 140 may include an MVNO network services application 144 configured to provide one or more services to the user of the mobile device 120 over the network 150. The one or more network services provided by the MVNO network services application 144 may additionally utilize a network service provided by the mobile network service provider 160. This utilization may occur via the mobile network services application 163. The one or more services may be associated with the unique authentication token and may be branded by the mobile virtual network operator 140 as a separate entity from the mobile network service provider 160. The functionality of the MVNO network services application 144 may be distributed or tasked to software running on a server at the mobile network service provider 160, MVNO client software 127 running on the mobile device 120, the mobile virtual network operator 140, and/or MVNO local services software 138 running on the personal computing device 130.

The mobile network service provider 160 may include a network services application 163 configured to provide mobile network services to the mobile device 120. The mobile network services may include voice communications between the mobile device 120 and another mobile device, landline telephone, computing device, and so forth over the network 150. The voice communications may include two-way communications as well as voice mail. The mobile network services may also include data communications between the mobile device 120 and another mobile device, computing device, or server over the network 150. The data communications may include internet communications, World Wide Web (WWW) communications, file transfers, SMS text message communications, instant messaging (IM) communications, email communications, and so forth.

The mobile network service provider 160 may be configured to monitor, track, and record the mobile device 120's usage of a network service provided by the mobile network services application 163 and/or an MVNO network services application 144. The record of the usage of the network service may be communicated to a billing application 167, an MVNO billing application 142, and an MVNO policy enforcement application 146. The record may be communicated for the purposes of billing the user for the network services used and/or enforcing policies related to using the network services. A two-way communication between the network services application 163 and the MVNO policy enforcement application 146 may be used to limit network services provided to the mobile device 120 to those that are authorized by the MVNO policy enforcement application 146.

The mobile network service provider 160 may also include a billing application 167 configured to facilitate billing the user for mobile network services provided by the network services application 163. Through the billing application 167, the mobile network service provider 160 may also bill the user on behalf of the mobile virtual network operator 140 and/or optional content provider 110.

The MVNO network services 144 may include a service whereby a user's communications with another person via multiple mediums are associated with one another for easy reference and access via the multiple mediums. The multiple mediums may include SMS text messaging, IM, voice telephone calls, voice over Internet Protocol (IP) communications, email, and multimedia mail. Multiple service providers may also be utilized for each of the multiple mediums.

The mobile virtual network operator 140 may provide a service whereby a user of the mobile device who receives a communication via one medium may respond using a different medium. An incoming message may prompt the user to select a response medium such that the user may choose to respond using the same medium or another medium. For example, the user of the mobile device 120 may receive an SMS text message from a colleague, and respond to the colleague via an email message. The user may respond in a manner similar to responding to the SMS message with another SMS message. In another example, the user may be able to call the colleague by choosing to respond via a voice phone call rather than an SMS message at the response prompt.

The MVNO network services 144 may include a service whereby a user of the mobile device 120 sees a record of communications with a contact that includes multiple mediums within a single list of communications history. The single list of communications history may include communications via SMS text message, IM, email, and voice telephone calls. The record of communications may be organized into a conversation incorporating the multiple mediums. For example, the conversation may include messages exchanged via one or more web email services, one or more personal or enterprise email software packages, one or more IM services, multimedia mail, and so forth.

The MVNO network services 144 may include a service like that described in U.S. application Ser. No. 11/729,314 entitled "System and Method for Group Management," whereby an optimal communication medium for the mobile device to communicate with an entity is determined. The entity may have a contact record stored at the mobile device 120. The contact record may include the entity's name, postal address, email address, mobile telephone number, landline telephone number, instant messenger address, and so forth. The mobile virtual network operator 140 may collect contact information for a contact record from sources associated with multiple communication mediums including email software installed on the personal computing device 130, a contacts database on the mobile device 120, a web email service, an instant messaging service, and so forth. The mobile virtual network operator 140 may monitor availability of a contact via one or more communication mediums and inform the user of the mobile device 120 which communication mediums are best to reach the contact at any given time. The best communication medium to reach the contact may also be dependent on the message type the user wishes to send the contact or a time period in which the user wishes to receive a response from the contact.

The MVNO network services 144 may include a broadcast messaging service whereby the mobile device 120 automatically sends a message to multiple contacts within a designated group of contacts, and the mobile virtual network operator 140 forwards the message via a different communication medium to different contacts depending on a determined optimal transmission communication medium for each contact. For example, a user of the mobile device 120 may send a text message to a group of contacts. Some contacts may receive the message via SMS text messaging, others via email, and still others via IM, based upon the determined optimal transmission communication medium for each contact. The optimal transmission communication medium may be determined based upon various factors such as predetermined preferences, presence, activity, and other contact-dependent factors monitored or determined by the mobile virtual network operator 140.

Each recipient contact may respond via an optimal response communication medium. The optimal response communication medium may be the same as or different from the optimal transmission communication medium. Each recipient's optimal response communication medium may be different than another recipient's optimal response communication medium. The broadcast messaging service may include text messaging, peercast, and polling.

The MVNO network services 144 may include a service whereby digital content is delivered to the mobile device 120 from the mobile virtual network operator 140, a digital content provider 110, a computing device 120, or a mobile network service provider 160. The digital content may be delivered over the network 150 based upon a location of the mobile device 120. The mobile virtual network operator 140 may determine the location of the mobile device 120 via a global positioning system (GPS) device at the mobile device 120, triangulation from multiple mobile network service provider base stations receiving a wireless signal from the mobile device 120, or a user input at the mobile device 120. For example, the mobile virtual network operator 140 may send the mobile device 120 a list of restaurants within several blocks of the location of the mobile device 120 based on a location determination.

The MVNO network services 144 may include a service whereby communications routed to the mobile device 120 are sent via an optimal communication medium, a communication medium appropriate for the location of the mobile device 120, or a communication medium determined to be most likely to be successful at contacting the user of the mobile device 120.

The MVNO network services 144 may include a service whereby the mobile device 120 uploads or transfers a representation of digital content to a computing device or server accessible via the network 150. The transfer may be performed in response to a user selection at the mobile device 120 using a proxy at the mobile virtual network Operator 140. This service may be used, for example, to enable the user of the mobile device 120 to publish photographs, videos, audio recordings, messages, and other digital content created or collected at the mobile device 120 to network-accessible computing devices or servers such as web sites or FTP sites, The service may also enable the mobile device 120 to upload digital content to the personal computing device 130 for personal purposes including data backup or transfer.

The mobile virtual network operator 140 may enable transfers to be made automatically. In one example, a transfer may be performed each time a photograph is taken at the mobile device 120. In another example, a transfer of data not previously uploaded may be performed at some predetermined time according to a backup schedule. A preference may be set at the mobile device 120 to control what data is uploaded, when the transfer occurs, where the transfer is posted, and so forth. The MVNO network services 144 may include a service whereby a communication via the mobile device 120 is journalled or backed up onto the personal computing device 130.

The MVNO network services 144 may include a service whereby the mobile virtual network operator 140 anticipates data that the user of the mobile device 120 may desire and proactively provides that data to the mobile device 120. The mobile virtual network operator 140 may anticipate data that the user desires based upon a variety of factors. These factors may include preset preferences set by the user, historical pattern of data access by the mobile device 120, or a location of the mobile device 120. The mobile virtual network operator 140 may push the anticipated data to the mobile device 120 via a web interface, an instant message, an SMS text message, an email, or other means of data delivery as known in the art.

The MVNO network services 144 may include a service whereby the mobile virtual network operator 140 performs a function in response to an SMS message sent from the mobile device 120. The function may be performed in response to a command or code contained within the SMS message. The function may include providing requested data to the mobile device 120 or performing processing of data and providing results of the processing to the mobile device 120.

The MVNO network services 144 may include a service whereby the mobile virtual network operator 140 proactively provides an advertisement and/or incentive to use mobile network services or access digital content. The advertised services or content may be offered by the mobile virtual network operator 140, a digital content provider 110, or the mobile network service provider 160. The advertisement and/or incentive may be provided via an SMS text message, a perishable application (as described elsewhere herein), or a client applet resident at the mobile device 120.

The MVNO network services 144 may include a service whereby digital content is streamed from the mobile virtual network operator 140 to the mobile device 120. The streamed digital content may originate from the mobile virtual network operator 140. Alternatively, the streamed digital content may be transferred to a server at the mobile virtual network operator 140 from another server over the network 150. The other server may be a digital content provider 110 or a personal computing device 130.

The MVNO network services 144 may include a service whereby a continuous virtual data connection between the mobile device 120 and a server or computing device over the network 150 is maintained even when a connection between the mobile virtual network operator 140 and the mobile device 120 is interrupted. The server or computing device may be digital content provider 110 or personal computing device 130. As an example, the mobile virtual network operator 140 may serve as a proxy for a virtual data connection. The virtual data connection may be a web connection between the mobile device 120 and a server over the network 150. If a network connection between the mobile virtual network operator 140 and the mobile device 120 is temporarily broken, the mobile virtual network operator 140 may continue to maintain an active data connection with the server. The network connection may be broken if the mobile device 120 is turned off or enters a location lacking a sufficient mobile network signal to maintain the network connection. The active data connection between the server and the mobile virtual network operator 140 enables the server to continue to recognize the virtual data connection with the mobile device 120 as being active.

The MVNO network services 144 may include a service whereby perishable software applications and/or digital content are transferred and installed on the mobile device 120 for temporary use. The mobile virtual network operator 140 may transfer and install a perishable application on the mobile device 120 to provide a temporary service to the user of the mobile device 120. After the perishable application is no longer required, the application is automatically deleted. By automatically deleting perishable applications that are no longer needed, memory on the mobile device 120 is freed for other purposes.

The MVNO network services 144 may include a visual voice mail service whereby the MVNO network services 144 stores one or more voice messages for unanswered telephone calls routed to the mobile device. The mobile virtual network operator 140 may create a textual list of the voice messages, optionally including the date, time, duration, and Caller ID information relating to each voice message. The mobile virtual network operator 140 may transfer data corresponding to the list to the mobile device 120 to enable the user of the mobile device 120 to select a voice message to retrieve among the list of stored voice messages.

The user may interact with the mobile virtual network operator 140 to make this selection using a web browser, an applet, a perishable application, or a client application installed on the mobile device 120. The mobile virtual network operator 140 may transfer a representation of the selected voice message to the mobile device 120 in the form of an audio data file, a perishable audio data file, or an audio playback within a voice telephone call. The mobile virtual network operator 140 may utilize servers and services provided by the mobile network service provider 160 to provide the visual voice mail service. For example, the mobile network service provider 160 may store the one or more voice messages on behalf of the mobile virtual network operator 140.

The mobile virtual network operator 140 may include an MVNO billing application 142 configured to facilitate billing a user of the mobile device 120 for network services; such as those provided through the MVNO network services application 144. The MVNO billing application 142 may communicate with the mobile network service provider billing application 167. The purpose of the communication may be for the mobile virtual network operator 140 to bill the user of the mobile device 120. The bill may be for network services 163 provided to the mobile device 120. The bill for the network services 163 may be provided by the mobile virtual network operator 140 on behalf of the mobile network service provider 160. Likewise, the MVNO billing application 142 may communicate with a content provider billing application 117. The purpose of the communication may be for the mobile virtual network operator 140 to bill the user of the mobile device 120. The bill may be for purchases of digital content 113. The bill for the purchases may be provided by the mobile virtual network operator 140 on behalf of the content provider 110.

The applications, content, and functionality of optional content provider 110 described herein may be included in mobile virtual network operator 140 and/or mobile network service provider 160. A server at the content provider 110 may be operated to provide digital content 113 to one or more customers over the network 150. The one or more customers may be users of the mobile device 120 or personal computing device 130. Digital content 113 at content provider 110 may be stored on a computer readable data storage medium such as a magnetic hard drive, optical disk, CD-ROM, DVD-ROM, HD-DVD disk, Blu-ray disk, magnetic tape, or flash memory.

The digital content 113 may include digital audio data files, mobile device ring-tones, e-book data files, picture data files, video data files, e-mail data files, voice message data files, SMS data files, document files, and software applications. The content provider 110 provides representations (e.g., copies) of the digital content 113 over the network 150.

The content provider 110 may also include billing application 117. The content provider 110 may be configured to bill a user for representations of the digital content 113 purchased and/or received from the content service provider 110. The content provider 110 may maintain an account record corresponding to a user, who may be a customer of the content provider 110. The account record may be similar to that described elsewhere herein with reference to the mobile virtual network operator 140. The content provider 110 may use the account record to determine whether to offer the user digital content 113, what items of digital content 113 to make available to the user, and what prices to charge the user for those available items of digital content 113.

The network 150 is inclusive of a wireless network such as a cellular telephone network, a WiFi network, a WiMax network, or a Long Term Evolution (LTE) network. The wireless network may be operated by a mobile network service provider such as the mobile network service provider 160. The network 150 may also include a wired network such as the Internet. The wired network may further include wired connections such as Ethernet connections, plain old telephone service (POTS) connections, digital subscriber line (DSL) connections, community access television (CATV) connections, fiber optic connections, and coaxial cable connections. The wired network may include a network operated by the mobile virtual network operator 140, content provider 110, or mobile network service provider 160. The content provider 110, mobile device 120, personal computing device 130, mobile virtual network operator 140, and/or mobile network service provider 160 may communicate with one another over the network 150 via one or more wireless and/or wired networks.

A user may initiate a connection between the mobile device 120 and the content provider 110 via the network 150. The connection may be established using a web browser running on the mobile device 120 and communicating with a web server running on a server at the content provider 110. Alternatively, the connection may be established using an applet or client software application running on the mobile device 120. The applet or client software application may be included with the MVNO client software 127. The applet or client software application, in turn, communicates with a server software application running on a server at the content provider 110. A content selection interface provided on the mobile device 120 may be configured to inform the user of one or more available items of digital content 113 available from the content provider 110.

The content provider 110 and/or the content selection interface may selectively enumerate available items of the digital content 113. These enumerations may be based upon various criteria such as user preferences, desired digital content genre or category, and user account balance with the content provider 110. The content selection interface may list the available items of digital content 113 in the form of a textual list, collection of graphical icons, or other means of presentation. After the user selects an available item from the list, the content selection interface, through mobile device 120, transmits the selection to the content provider 110 via the network 150.

The content provider 110 may be configured to require the user of the mobile device 120 to authorize a purchase of the selection through the billing application 117. Identifying information (as disclosed elsewhere herein) may be transmitted by the user and/or the mobile device 120 to the content provider 110. The identifying information may be used to authorize the purchase. For example, the identifying information may be compared with the account record. The billing application 117 may store a user's credit card number on file and allow the user to authorize a charge on the credit card by transmitting a password from the mobile device 120 to the content provider 110 or via an SMS message.

The billing application 117 may transmit a Premium SMS message or a Reverse Billed SMS message to the mobile device 120 requesting the user to authorize the purchase of the selection. After the user authorizes a charge for the purchase, the content provider 110 bills the user via the mobile virtual network operator 140 or the mobile network service provider 160 on behalf of the content provider 110. In this manner, the mobile virtual network operator 140 or the mobile network service provider 160 may include a charge from the content provider 110 on the user's mobile virtual network operator or mobile network service provider bill. The user may then pay the mobile virtual network operator 140 or the mobile network service provider 160 directly for the charge as part of the user's bill payment. The mobile virtual network operator 140 or the mobile network service provider 160 then pays the content provider 110 for the charge, which may include a transaction fee.

The content provider 110 may be configured to transfer a representation (e.g., transmit a copy) of the selected digital content 113 to the personal computing device 130 associated with the user of the mobile device 120. The representation may include a single selected format of the selected digital content 113 or multiple formats of the selected digital content 113. For example, the representation may include a digital music file in an MP3 format and another representation of the same digital music file in an AAC format. Alternatively, the representation may include multiple representations of a digital music file encoded at different bit rates. For example, one representation may be optimized for quality at a higher bit rate and have a larger file size, while another representation is optimized to conserve bandwidth at a lower bit rate and have a smaller file size. The representation optimized for quality may be intended for transfer to the mobile device 120 in a single "chunk", while the representation optimized to conserve bandwidth may be intended to transfer to the mobile device 120 via streaming media.

The personal computing device 130 may be owned or controlled by an entity other than the mobile virtual network operator 140, mobile network service provider 160, and content provider 110. Alternatively, the personal computing device 130 may be owned or controlled by an entity that owns or controls any of the above. The personal computing device 130 may be owned or controlled by the user of the mobile device 120. The personal computing device 130 includes MVNO local services software 138. The MVNO local services software 138 may be configured to perform functions related to the MVNO network services application 144. The MVNO local services software 138 may also include a content acquisition application configured to receive the representation of the selected digital content 113 from the content provider 110. The content acquisition application is configured to store the representation of the selected digital content 113 to a local content store 132. The personal computing device 130 may be configured to receive a unique authentication token from the mobile device 120. Based on the authentication token, the personal computing device 130 may authorize the mobile device 120 to access data or utilize services provided by the personal computing device 130.

The local content store 132 may be stored on a computer readable data storage medium as discussed elsewhere herein. The representation of the selected digital content 113 may be stored in an original form as received from the content provider 110. The representation of the selected digital content 113 may be stored in the local content store 132 indefinitely, whether or not a representation of the selected digital content 113 is transferred to the mobile device 120. If the mobile device 120 is lost or damaged, the representation of the selected digital content 113 may not be lost.

The personal computing device 130 also includes content management software 136. The content management software 136 may be configured to manage digital content stored in local content store 132, MVNO local services software 138, content reformatting application 135, and content transfer application 134. Various content management functions may be performed by the content management software 136 or by other software modules in conjunction with the content management software 136.

The personal computing device 130 may be configured to reformat downloaded digital content using the content reformatting application 135. The content reformatting application 135 may decode, encode, transcode, or resample digital content. The content reformatting application 135 may initiate reformatting of the downloaded content in response to a command issued by another software module at the personal computing device 130, the content provider 110, or by the mobile device 120. Reformatting may also occur automatically according to user preferences stored at the personal computing device 130. The content reformatting application 135 may include copying a file stored in the local content store 132 while changing a file format from one format to another, or while changing a bit rate or resolution such that the copy has a different bit rate or resolution than the original.

In one example, the content reformatting application 135 reformats an MPEG-2 encoded video file to a 3 GP encoded video file by copying the MPEG-2 encoded video file and saving the copied video file in the local content store 132 as a 3 GP encoded video file. In a second example, the content reformatting application 135 reformats an AVI encoded video file having a resolution of 720 by 480 pixels to an AVI encoded video file having a resolution of 360 by 240 pixels. In another example, the content reformatting application 135 reformats an MPEG-4 encoded video file having a frame rate of approximately 30 frames per second (fps) to an MPEG-4 encoded video file having a frame rate of approximately 15 fps. By further example, the content reformatting application 135 reformats an MP3 encoded audio file having a bit rate of 192 kilobits per second (kbps) to an MP3 encoded audio file having a bit rate of 128 kbps.

The content reformatting application 135 may also be configured to reformat the downloaded content based upon a command received from the mobile virtual network operator 140 or available bandwidth between the personal computing device 130 and the mobile device 120. The content reformatting application 135 may also reformat the downloaded content based upon a factor dependent on the personal computing device 130 such as available storage space at the personal computing device 130, a factor dependent on the mobile device 120, a user-selectable preference, or a preset preference. The factor dependent on the mobile device 120 may include supported codecs (e.g., MP3 and WMA), bit rates (i.e., bits per second), sampling rates (i.e., samples per second), sample resolutions (i.e., bits per sample), and video frame rates (i.e., frames per second). The factor dependent on the mobile device 120 may also include processing power, memory size, free available memory, screen size, and screen resolution.

The reformatting may be performed such that the reformatted digital content transferred to the mobile device 120 corresponds to an optimal data size range as determined by factors listed above. As an example, the downloaded content may be reformatted to more compact file sizes when free available memory at the mobile device 120 is low. Alternatively, the downloaded content may be reformatted to larger file sizes when free available memory at the mobile device is high. As another example, the downloaded content may be reformatted to a lower resolution screen size when the mobile device 120 is a cellular telephone than when the mobile device 120 is a PDA. The downloaded content may be reformatted to resolution somewhat larger (finer) than the screen size resolution to allow the downloaded content to be zoomed and cropped to a reasonable degree at the mobile device 120.

The content transfer application 134 is configured to transfer a representation of the downloaded content to the mobile device 120. The content transfer application 134 may transfer the representation of the downloaded content in response to a command received from the content provider 110, the mobile virtual network operator 140, the mobile device 120, a user of the personal computing device 130, and/or the content management software 136. Alternatively, the content transfer application 134 may transfer the representation of the downloaded content automatically according to a user preference setting.

The content transfer application 134 may transfer the representation of the downloaded content to the mobile device 120 as a single file sent in one contiguous "chunk" by a protocol such as File Transfer Protocol (FTP). Alternatively, the content transfer application 134 may transfer the representation of the downloaded content to the mobile device 120 using a streaming media protocol such as User Datagram Protocol (UDP), Real-time Streaming Protocol (RTSP), Real-time Transport Protocol (RTP), Real-time Transport Control Protocol (RTCP), Transmission Control Protocol (TCP), or other protocols suitable for streaming digital media over networks. Transferring the representation using the streaming media protocol may be referred to as "streaming" the representation.

The content reformatting application 135 may be configured to reformat a file stored in the local content store 132 based upon a characteristic of the file such as file size, file type, access history, or probability of being requested by the mobile device 120. The format and/or resolution used for reformatting may be chosen based upon a historical pattern of formats or resolutions previously requested by the mobile device 120. Similarly, a historical record of available bandwidth between the personal computing device 130 and the mobile device 120 may be used.

In an example, downloaded content that is identified as having been frequently accessed is reformatted in advance of being requested by the mobile device 120. Likewise, in another example, downloaded content such as an audio book may be reformatted at a lower bit rate than downloaded content such as a music file, which requires a higher bit rate.

Mobile device 120 includes a content reception interface 125 configured to receive the representation of the downloaded content transferred by the personal computing device 130. The content reception interface 125 may be integrated with various components configured to store the representation of the downloaded content. The downloaded content may be stored at a mobile content store 122 for later retrieval and use on the mobile device 120. The mobile content store 122 may include a computer-readable data storage medium as described elsewhere herein. The content reception interface 125 may alternatively be configured to buffer the representation of the downloaded content for more immediate playback on the mobile device 120.

The mobile virtual network operator 140 may be configured to act as an intermediary between the personal computing device 130 and the mobile device 120. The MVNO network services 144 may include a content transfer application configured to relay data between the personal computing device 130 and the mobile device 120. In this configuration, rather than transferring a representation of the downloaded content from the local content store 132 to the mobile device 120, the content transfer application 134 transfers a representation of the downloaded content to the mobile virtual network operator 140 via the network 150. The mobile virtual network operator content transfer application receives the representation of the downloaded content from the personal computing device 130, optionally reformats the representation of the downloaded content using a content reformatting application within the MVNO network services 144, and transfers the optionally reformatted representation of the downloaded content to the mobile device 120.

The personal computing device 130, the mobile network service provider 160, or the mobile virtual network operator 140 may be configured to monitor and measure available communication channel bandwidth in a connection to the mobile device 120 over the network 150. The available bandwidth may be determined by monitoring data throughput between the personal computing device 130, a digital content provider 110, or mobile virtual network operator 140 and the mobile device 120. The bandwidth may be measured continuously during data transmission such that when a bandwidth measurement value is desired, a separate bandwidth measurement does not need to be made.

Alternatively, the available bandwidth may be determined based on a network service plan that includes policies that enforce a limit on available bandwidth to some predetermined value. For example, a basic network service plan may include a lower bit per second bandwidth for streaming media or a lower limit on kilobits of data transfer per billing period than an expanded network service plan. The available bandwidth may also be determined based upon a difference between the service plan policy limit and a measure of the service already utilized during a billing period. The network service plan may be provided and/or enforced by either or both the mobile virtual network operator 140 and the mobile network service provider 160.

The available bandwidth may be used to determine a format, bit rate, or resolution of the representation of digital content transferred to the mobile device 120. The mobile virtual network operator 140 may reformat digital content transferred to the mobile device 120 to correspond to the available bandwidth. In an example, the personal computing device 130 measures throughput of data transmitted to the mobile device 120 to be 100 kbps. The personal computing device 130 then uses the content reformatting application 135 to resample a selected MP3 file in the local content store 132 from 192 kbps to 96 kbps prior to streaming the MP3 file to the mobile device 120.

The personal computing device 130 may be configured to transfer a representation of any data stored on the personal computing device 130. For example, the personal computing device 130 may allow the mobile device 120 to access data available at the personal computing device 130 such as the downloaded content or other data that was not downloaded from the digital content provider 110, including data on a computer readable storage medium coupled to the personal computing device 130. The personal computing device 130 may include an indexing engine to index data available for access by the mobile device 120 via the computing device 130. The mobile device 120 and the computing device 130 may be configured to communicate with each other in a manner similar to that described elsewhere herein with reference to the mobile device 120 selecting and downloading digital content from the digital content provider 110.

The personal computing device 130 may be configured to receive an authentication token from the mobile device 120 to authorize the mobile device 120 prior to providing data and/or services to the mobile device 120. The authentication token may be an identifying element associated with the user of the mobile device 120 or the mobile device 120 itself.

The personal computing device 130 may be configured to serve as a proxy for the mobile device 120. The personal computing device 130 may allow the mobile device 120 to access network services and servers such as the content provider 110 via a proxy application. The proxy application may be included within the MVNO local services software 138. The proxy application may be configured such that a connection between the mobile device 120 and the content provider 110 via the proxy application appears to be a direct connection.

Alternatively, the proxy application may be configured to allow the mobile device 120 to control a direct connection between the personal computing device 130 and the content provider 110. Additionally, the proxy application may allow the mobile device 120 to access any data available via a connection from the personal computing device 130 to one or more computing devices and servers over the network 150. The mobile device 120 and the proxy application may be configured to communicate with each other in a manner similar to that described elsewhere herein with reference to the mobile device 120 selecting and transferring digital content from the digital content provider 110. The mobile virtual network operator 140 may also be configured to serve as a proxy for the mobile device 120 in a manner described above with reference to the personal computing device 130.

Figure 2:
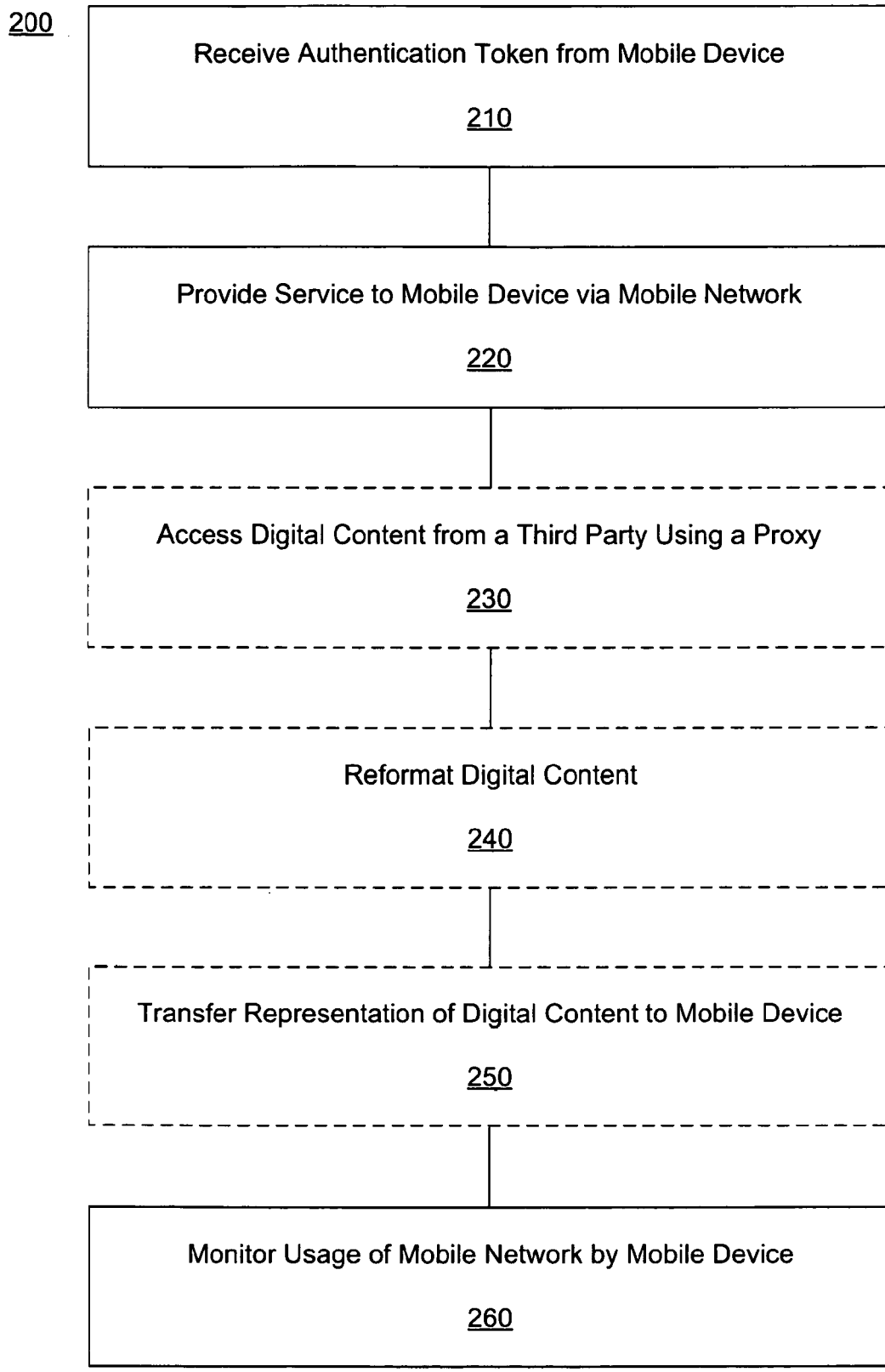
FIG. 2 is a flowchart depicting a method of operating a mobile virtual network.

FIG. 2 is a flowchart depicting a method of operating a mobile virtual network. In this exemplary method 200, a mobile network service is provided by authenticating a mobile device (120) over a mobile network, providing a service to the mobile device, and monitoring usage of the mobile network by the mobile device.

In step 210, the mobile device is authenticated over the mobile network. A server associated with a mobile virtual network operator (MVNO, 140) may receive an identifying element from the mobile device. The identifying element may be used as a unique authentication token to authenticate the mobile device. The server may then authenticate the mobile device based on the authentication token. The mobile device may be communicatively coupled to the server over the mobile network.

In step 220, a service is provided to the mobile device via the mobile network. The service may be provided in response to or in association with the authentication token discussed with reference to step 210. The service may be branded by an entity other than the operator of the mobile network. For example, the service may be branded by an MVNO. In optional step 230, digital content on a server communicatively coupled with the mobile network is accessed by the mobile device. The server may be owned or operated by a third party. The third party may be an entity other than an owner or user of the mobile device. The third party may also be an entity other than the MVNO. The access may include receiving a list of digital content available for purchase or download and downloading the digital content to a personal computing device. The personal computing device may be communicatively coupled to both the server and the mobile device. The access may include streaming digital content from the server to the mobile device or a personal computing device. The user may access digital content by first selecting the digital content to access from a list presented to the user at the mobile device. The digital content may be accessed via a proxy application. The proxy application may run on the personal computing device or on a server at the MVNO.

In optional step 240, the digital content is reformatted. The computing device may reformat the digital content by copying the accessed digital content and saving the copied digital content on a computer readable storage medium in a different format. Reformatting may include filtering, transcoding, refactoring, and/or resampling. The reformatting may be performed in response to a request received from the mobile device. This request may include a request to download content in a format different from that of the accessed digital content.

The new format requested may be based upon a variety of factors including user settings, content genre, original content format, DRM authorization, and available free storage space on a computer readable storage medium coupled with the computing device. Additional factors include available bandwidth of a data channel between the mobile device and the computing device and available bandwidth of a data channel between the MVNO and the mobile device. Other factors related to the mobile device include screen size, screen resolution, memory size, available free memory, processing power, supported codecs, supported bit rate, supported sampling rate, supported sample resolution, supported video frame rate, and the like.

The computing device may reformat the digital content in one or more different formats automatically upon receiving the digital content from the content provider. By automatically reformatting in advance of a request to download the digital content to the mobile device, latency between a request to download the reformatted digital content to the mobile device and completion of the requested download may be reduced. The MVNO, which is communicatively coupled with the computing device and the mobile device over the network, may receive the digital content from the computing device and reformat the digital content in preparation to forward the reformatted digital content to the mobile device.

In optional step 250, a representation of the digital content is transferred to the mobile device. The computing device may transfer the representation of the digital content over the network. The MVNO may transfer the representation of the digital content to the mobile device.

The mobile device, the MVNO, and/or the computing device may be configured to automatically and/or periodically transfer a representation of digital content from the computing device to the mobile device. The transferred representation may be chosen according to a variety of factors. The transferred representation may be chosen randomly or according to user settings such as a playlist. The transferred representation may also be chosen according to a history of prior transfers. The history of prior transfers may indicate the frequency with which various digital content has been transferred in the past. The history of prior transfers may also indicate an elapsed time since a particular item of digital content has been transferred. The transferred representation may also be chosen according to a characteristic of recently downloaded digital content or an analysis of web sites recently visited by the user of the mobile device. Additionally, the transferred representation may be chosen according to a location of the mobile device.

The digital content received from the server hosting the digital content may require a storage capacity exceeding the available memory or storage space on the mobile device. The mobile device and/or the computing device may be configured to transfer a representation of a portion of the digital content rather than the entire received digital content. The user of the mobile device may be queried to select one or more portions of the digital content to transfer. The user of the mobile device may be queried regarding whether to transfer the one or more portions of the digital content via contiguous "chunks" and/or streaming media. An algorithm may be utilized to automatically select the one or more portions of the digital content to transfer based upon factors as described elsewhere herein.

The mobile device may be configured to selectively replace existing digital content already stored at the mobile device with a representation of the digital content received from the server hosting the digital content by deleting the selected stored digital content to free storage space prior to transferring the representation of the digital content received from the server. One or more of a variety of algorithms may be provided to select the stored digital content to delete. The algorithm may consider one or more of the following factors in making the selection: available storage space, frequency of access or playback, elapsed time since last access or playback, user-specified priority, or user-selection at a deletion prompt. Additional factors the algorithm may consider include logical grouping or genre of digital content such as music style, artist, album, program series, and so forth. Alternatively, the mobile device may be configured to receive the digital content by streaming media if the mobile device has insufficient available memory or storage space to receive the digital content via contiguous "chunks".

The mobile device, the MVNO, and/or the computing device may be configured to establish a lifetime for a representation of digital content to remain on the mobile device prior to automatically being deleted. The lifetime may be useful to provide a means for digital content to be automatically deleted to free memory on the mobile device. The lifetime may be a characteristic of a perishable or disposable representation of digital content. The lifetime may also be set according to a requirement of the content provider, for example to enforce a rental of digital content as opposed to a purchase of digital content.

In step 260, usage of the mobile network by the mobile device is monitored. Usage of service provided to the mobile device by the mobile virtual network and the mobile network service provider may be monitored. The MVNO or the mobile network service provider may monitor the usage and may track and record the usage. The record of the usage may be used for billing purposes.

Figure 3:
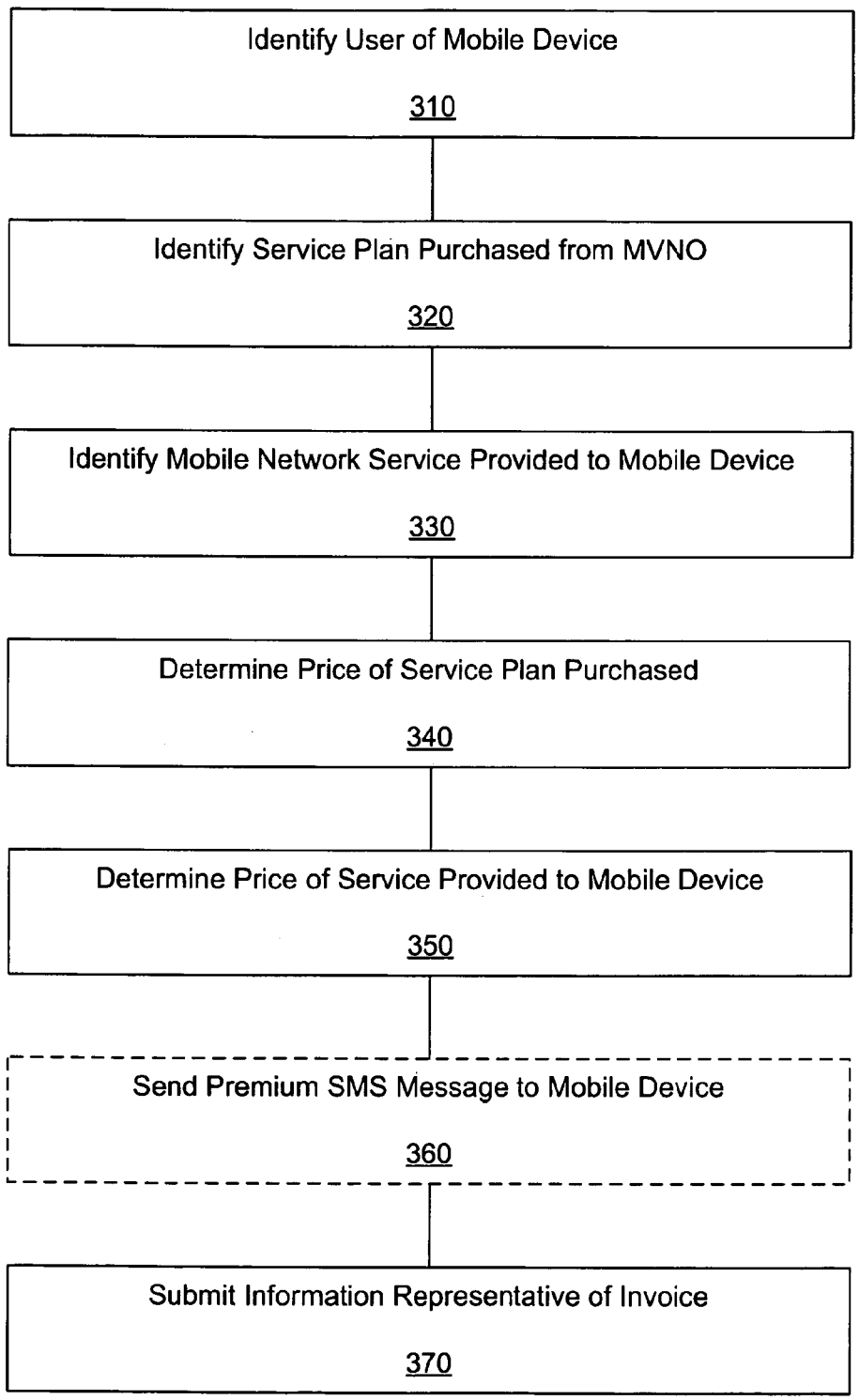
FIG. 3 is a flowchart depicting a billing method for a mobile virtual network operator.

FIG. 3 is a flowchart depicting a billing method 300 for a mobile virtual network operator. In this exemplary billing method 300, a user of a mobile device (120) is identified by the MVNO and/or a mobile network service provider. Additionally, a network service and service plan are identified and priced. Furthermore, the MVNO bills the user on behalf of the mobile network service provider.

In step 310, the user of the mobile device is identified. The MVNO and/or the mobile network service provider may maintain a customer account record corresponding to the user. The user may be a customer of the MVNO. The MVNO and/or the mobile network service provider may identify the user by receiving at least one identifying element from the mobile device and matching the at least one identifying element with the customer account record.

In step 320, the user's service plan subscribed to or purchased from the MVNO is identified. The service plan may be identified by an entry in the user's customer account record. The service plan may also be identified by the user selecting the service plan to purchase from a list or enumeration of service plans offered for purchase to the user.

In step 330, a mobile network service provided to the mobile device is identified. The mobile network service may be provided by the MVNO. Alternatively, the mobile network service may be provided by the mobile network service provider on behalf of the MVNO. Data transmitted by the mobile device may be used to identify the mobile network service. For example, the mobile device may transmit an SMS text message. According to an SMS text message standard protocol, a data sequence may be provided which uniquely identifies the mobile network service as an SMS text message. The mobile network service may also be identified by the user. The user may select the mobile network service from a list or enumeration of mobile network services.

In step 340, a price of the service plan purchased is determined. The price may be determined according to the user's customer account record. The price may also be determined according to list prices offered to all customers. Special offers and discounts offered to the user may also be taken into account in determining the price. An auction may be used to determine the price. Other methods of determining a price as known in the art may be used.

In step 350, a price of the mobile network service provided to the mobile device is determined. The price may be determined in a manner similar to that described with reference to step 340. A financial transaction may be conducted including an agreement by the user to pay the price for the mobile network service provided to the mobile device by the MVNO, the payment optionally being made via a third party.

In an exemplary method of conducting the financial transaction, the MVNO bills the user directly. The MVNO may have the user's credit card on file as part of the user's customer account record. The MVNO may use SMS-based authorization or a software application installed on the mobile device. The software application may be configured to conduct the financial transaction between the user of the mobile device and the MVNO. The software application may include security features such as encryption in conducting the financial transaction. A unique authentication token may be provided by the mobile device to validate the financial transaction.

In optional step 360, a Premium SMS Message is sent to the mobile device. The Premium SMS Message may be sent to the user of the mobile device via the mobile network to conduct a financial transaction. The Premium SMS Message may be encoded to facilitate the following sequence of activities. The user identified in step 310 replies to the Premium SMS Message. By replying, the user confirms an agreement to purchase the service plan and/or the mobile network service selected in steps 320 and 330. Additionally, the user confirms an agreement to pay the prices determined in steps 340 and 350, respectively. Alternatively, the user may be instructed to send an SMS message to a specified number, such as a 5 digit Short Code, to confirm the agreement to purchase the service plan and/or the mobile network service.

The Premium SMS message may be used to validate the financial transaction. Validating the financial transaction includes the following activities. The user identified in step 310 executes an agreement to purchase the service plan and/or the mobile network service selected in steps 320 and 330. The user executes an agreement to purchase the service plan and/or the mobile network service for the prices determined in steps 340 and 350, respectively. The financial transaction may be validated by receiving a purchase confirmation in response to the Premium SMS message. Validating the financial transaction may include the MVNO receiving an identifying element from the user. The identifying element may be used as a unique authentication token to validate the financial transaction.

In step 370, information representative of an invoice for the service plan purchased and the network service provided to the mobile device is submitted to the MVNO. The invoice may relate to the Premium SMS message discussed in relation to step 360. The user may then be billed on behalf of the mobile network service provider by the MVNO. The information may include an identity of the user of the mobile device, a price of the service plan purchased by the user of the mobile device, a price of the network service provided to the mobile device, a date of the purchase, and so forth. A charge for the service plan and network service may be included on an MVNO bill sent to the user. The user may pay the MVNO for the charge. The MVNO may pay the mobile network service provider at least a portion of the amount paid by the user. The MVNO may optionally subtract a transaction fee or the like from the amount paid by the user before paying the mobile network service provider.

Figure 4:
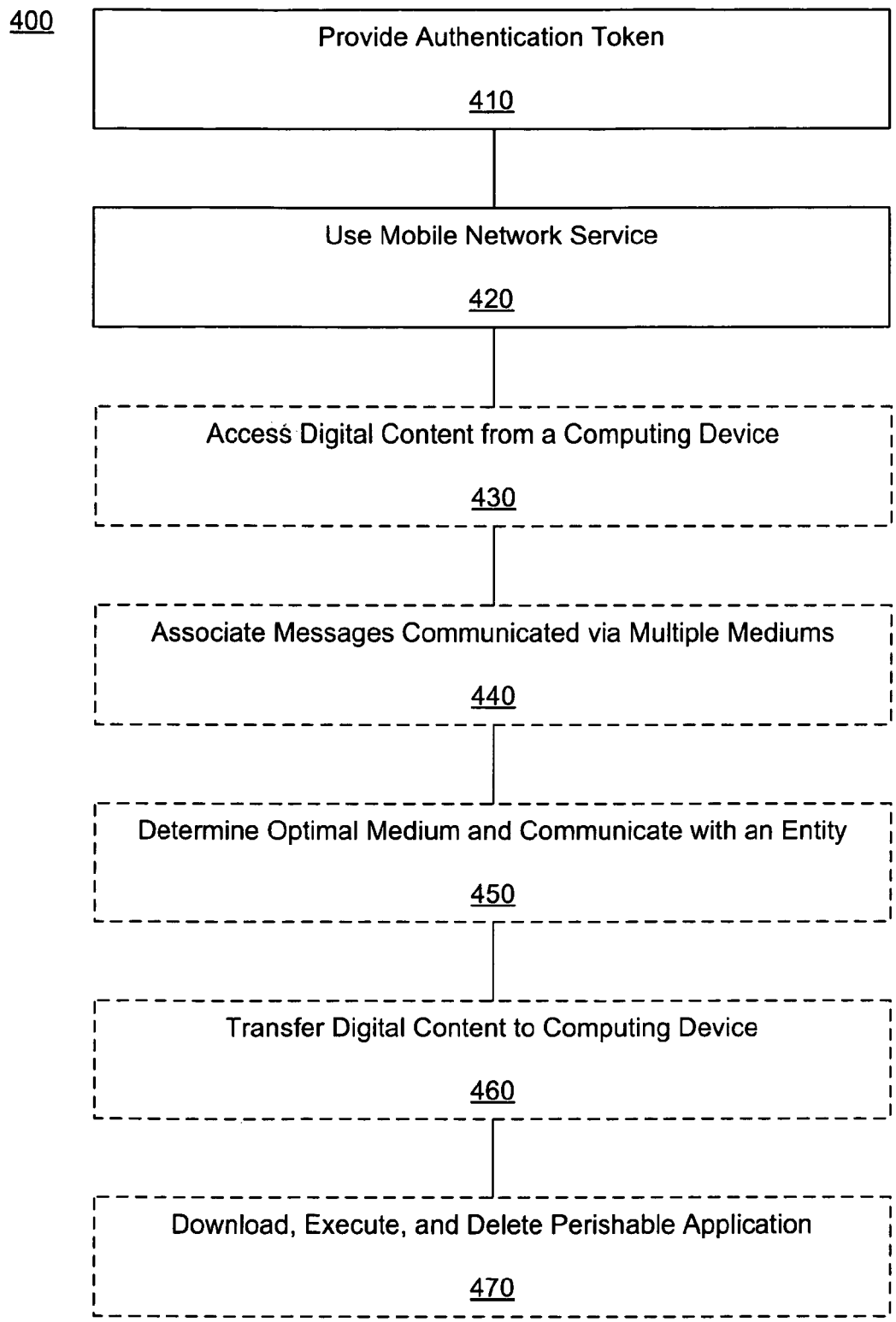
FIG. 4 is a flowchart depicting a method of using a service provided by a mobile virtual network operator.

FIG. 4 is a flowchart depicting a method 400 of using a service provided by a mobile virtual network operator. In this exemplary method 400, a unique authentication token is provided by a mobile device (120) over a mobile network. A network service is used on the mobile device. The method further includes downloading a representation of digital content to the mobile device over the mobile network.

In step 410, a mobile device provides a unique authentication token to a server over a mobile network. The authentication token may be an identifying element used to identify and authenticate the mobile device with a provider of a mobile network service. The server may be associated with the provider of the mobile network service or an MVNO. The server may use the authentication token to authenticate the mobile device.

In step 420, the mobile device uses a service provided by the server via the mobile network. The service may be provided in response to or association with the unique authentication token discussed with reference to step 410. The service may be branded by an entity other than the operator of the mobile network, such as an entity that owns or controls the server or an MVNO.

In optional step 430, the mobile device accesses digital content from a computing device over the mobile network. The access may be performed in a manner similar to optional step 230. The mobile device may download a representation of digital content stored at the computing device communicatively coupled to the server over a network (150). The download may be responsive to or authorized by the unique authentication token provided to the server by the mobile device as described in step 410. The computing device may be owned, operated, or controlled by an entity other than an entity that operates the mobile network or the server. For example, the computing device may be owned, operated, or controlled by a user of the mobile device or a digital content provider.

In optional step 440, messages communicated via multiple mediums are associated with one another. For example, messages communicated with a single entity via multiple mediums may be associated with one another in a chronologically ordered list. The chronologically ordered list may be presented to the user of the mobile device as a single conversation.

In optional step 450, an optimal communication medium is determined for communicating a message to an entity. The message is then communicated to the entity using that medium. The determination of the optimal communication medium may be based on at least one communication characteristic related to the entity, such as most recently used or most frequently used communication medium between the user of the mobile device and the entity. The determination of the optimal communication medium may also be based on time of day or day of week. The determination of the optimal communication medium may also be based on length of message, urgency of message, or type of message (e.g., voice, text, picture, or video). The determination of the optimal communication medium may also be based on user-selectable preference or predefined preference. The determination of the optimal communication medium may also be based on location, presence of the entity, or availability of the entity via the communication medium. After the optimal communication medium is determined, the message is communicated to the entity over the determined optimal communication medium.

In optional step 460, a representation of digital content stored at the mobile device is transferred to the computing device over the network. The transfer may be performed automatically or by explicit instruction from the user of the mobile device. The transfer may be performed to back up the digital content from the mobile device to the computing device. The transfer may be performed to publish the digital content and thereby make the digital content available to others over the network via the computing device.

In optional step 470, a perishable application is downloaded, executed, and deleted. The perishable application is downloaded from a server to the mobile device over the mobile network. The mobile device executes the perishable application. After the perishable application has been executed a predetermined number of times, has resided on the mobile device longer than a preset period of time, or is no longer needed, the perishable application is deleted from the mobile device.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method comprising:
    receiving a unique authentication token from each of a first device and a second device;
    transferring to a content selection interface on the first device an indication of content available from a content provider;
    transmitting selected content to the first device in response to a user selection of the content available from the content provider at the first device;
    automatically transmitting the selected content to the second device,
    wherein the selected content is transmitted to the first device through a first connection and transmitted to the second device through a second connection distinct from the first connection.

2. The method of claim 1, further including receiving an authorization to purchase the selected content from the first device before the selected content is transmitted to the first device.

3. The method of claim 1, wherein the selection is made on an application on the first device.

4. The method of claim 1, wherein the first device and the second device are owned by the same owner.

5. The method of claim 1, wherein the selected content is transmitted to the first device at a first time over the first connection and transmitted to the second device at a subsequent time over the second connection.

6. The method of claim 1, wherein transmitting to the second device is performed in response to instructions from the first device.

7. The method of claim 1, including receiving additional content from the first device.

8. The method of claim 7, wherein the received additional content is photographs.

9. The method of claim 7, wherein the received additional content is also transmitted to the second device.

10. The method of claim 1, wherein the selected content transmitted to the first device has a different resolution for display thereon from the content transmitted to the second device for display thereon.

11. A digital content server comprising:
    a memory; and
    a processor configured for:
        receiving a unique authentication token from each of a first device and a second device;
        transferring to a content selection interface on the first device an indication of content available from a content provider;

transmitting selected content to the first device in response to a user selection of content available from the content provider at the first device; and
automatically transmitting the selected content to the second device,
wherein the selected content is transmitted to the first device through a first connection and to the second device through a second connection distinct from the first connection.

12. The server of claim 11, wherein the server is configured for:
receiving an authorization to purchase the selected content from the first device.

13. The server of claim 11, wherein the selection is made on an application on the first device.

14. The server of claim 11, wherein the first device and the second device are owned by the same owner.

15. The server of claim 11, wherein the selected content is transmitted to the first device at a first time and transmitted to the second device at a subsequent time.

16. The server of claim 15, wherein transmitting to the second device is performed in response to instructions from the first device.

17. The server of claim 11, wherein the server is further configured for:
receiving additional content from the first device.

18. The server of claim 17, wherein the additional content is photographs.

19. The server of claim 17, wherein the additional content is also transmitted to the second device.

20. The server of claim 11, wherein the selected content transmitted to the first device has a different resolution for display thereon from the selected content transmitted to the second device for display thereon.

21. A first device having a memory and a processor, the first device configured for:
receiving, on a content selection interface of a first device, an indication of content available from a content provider server; and
receiving selected content in response to a user selection of content available from the content provider server,
wherein the selected content is automatically transmitted from the content provider server to a second device that is owned by the same owner as the first device,
wherein each of the first device and the second device transmit a unique authentication token for authenticating each of the first device and the second device,
wherein the selected content is received at the first device through a first connection and received at the second device through a second connection distinct from the first connection.

22. The first device of claim 21, wherein the first device is further configured for:
transmitting an authorization to purchase the selected content to the content provider server.

23. The first device of claim 21, wherein the selection is made on an application on the first device.

24. The first device of claim 21, wherein the selected content is received at the first device at a first time and received at the second device at a subsequent time.

25. The first device of claim 21, wherein the first device is configured to transmit additional content, and the additional content is photographs.

26. The first device of claim 21, wherein the selected content received at the first device has a different resolution for display thereon from the content received at the second device for display thereon.

27. A system comprising:
a first device operating over a wireless network;
a second device operating over the wireless network; and
a digital content server configured for:
receiving a unique authentication token from each of the first device and the second device;
transferring to a content selection interface on the one of a first device or a second device an indication of content available from a content provider;
transmitting selected content to the first device in response to a user selection of content available from the content provider at the first device;
automatically transmitting the selected content to the second device,
wherein the selected content is transmitted to the first device through a first connection and transmitted to the second device through a second connection distinct from the first connection.

28. The method of claim 1, wherein the first device and the second device are not directly communicatively connected to each other.

29. The method of claim 1, wherein the authentication token is specific to the user of the first device and the second device.

30. The method of claim 1, wherein the first connection is one of a wifi or cellular connection, and wherein the wifi or cellular connection is selected based on a size characteristic of the transmitted content.

31. The server of claim 11, wherein the first device and the second device are not directly communicatively connected to each other.

32. The server of claim 11, wherein the authentication token is specific to the user of the first device and the second device.

33. The server of claim 11, wherein the first connection is one of a wifi or cellular connection, and wherein the wifi or cellular connection is selected based on a size characteristic of the transmitted content.

34. The first device of claim 21, wherein the first device is not directly communicatively connected to the second device.

35. The first device of claim 21, wherein the authentication token is specific to the user of the first device and the second device.

36. The first device of claim 21, wherein the first connection is one of a wifi or cellular connection, and wherein the wifi or cellular connection is selected based on a size characteristic of the transmitted content.

37. The system of claim 27, wherein the first device is not directly communicatively connected to the second device.

38. The system of claim 27, wherein the authentication token is specific to the user of the first device and the second device.

39. The system of claim 27, wherein the first connection is one of a wifi or cellular connection, and wherein the wifi or cellular connection is selected based on a size characteristic of the transmitted content.

* * * * *